United States Patent [19]

Stewart

[11] 4,285,201
[45] Aug. 25, 1981

[54] VAPOR POWERED ENGINE ASSEMBLY

[76] Inventor: Robert C. Stewart, 739 Appleway, Coeur D'Alene, Id. 83814

[21] Appl. No.: 26,022

[22] Filed: Apr. 2, 1979

Related U.S. Application Data

[63] Continuation-in-part of Ser. No. 848,873, Nov. 7, 1977, Pat. No. 4,156,343.

[51] Int. Cl.³ .............................................. F03G 7/02
[52] U.S. Cl. .................................... 60/641 A; 60/657; 60/671; 60/676
[58] Field of Search ................... 60/516, 643, 645, 651, 60/671, 721, 907, 641, 676, 657, 670

[56] References Cited

U.S. PATENT DOCUMENTS

| | | | |
|---|---|---|---|
| 4,014,172 | 3/1977 | Jones | 60/721 X |
| 4,033,136 | 7/1977 | Stewart | 60/671 |
| 4,156,343 | 5/1979 | Stewart | 60/676 X |

Primary Examiner—Allen M. Ostrager
Assistant Examiner—Stephen F. Husar
Attorney, Agent, or Firm—William C. Babcock

[57] ABSTRACT

An engine assembly that is powered by high pressure vapor from a volatile liquid that has a boiling point substantially below the minimum ambient temperature in the geographical location in which the engine assembly will be used. Heat for volatilizing the liquid may be withdrawn from the ground, naturally occurring sources of water, as well as from sunlight and waste heat from industrial installations. Although the engine assembly is capable of being used to produce power for any desired purpose, it is particularly adapted for use in pumping water from a well, with the pumped water not only being used for irrigation purposes and the like, but also to effect an initial cooling of the low pressure vapor discharged from the engine assembly prior to the vapor being further cooled and pressurized to return to the liquid state whereupon it is heated and recycled through the engine assembly. The volatile liquid may be a suitable one of the various Freons that are commercially available, such as Freon 22, liquid carbon dioxide, ammonia, or the like. Although the engine assembly will preferably operate on naturally occurring heat, it is adapted to operate on heat from a conventional fuel such as Diesel oil, wood, sawdust and the like when the occasion so requires. Water may also be used as a source of vapor providing the source of heat is of sufficient magnitude to convert the water to superheated steam.

20 Claims, 13 Drawing Figures

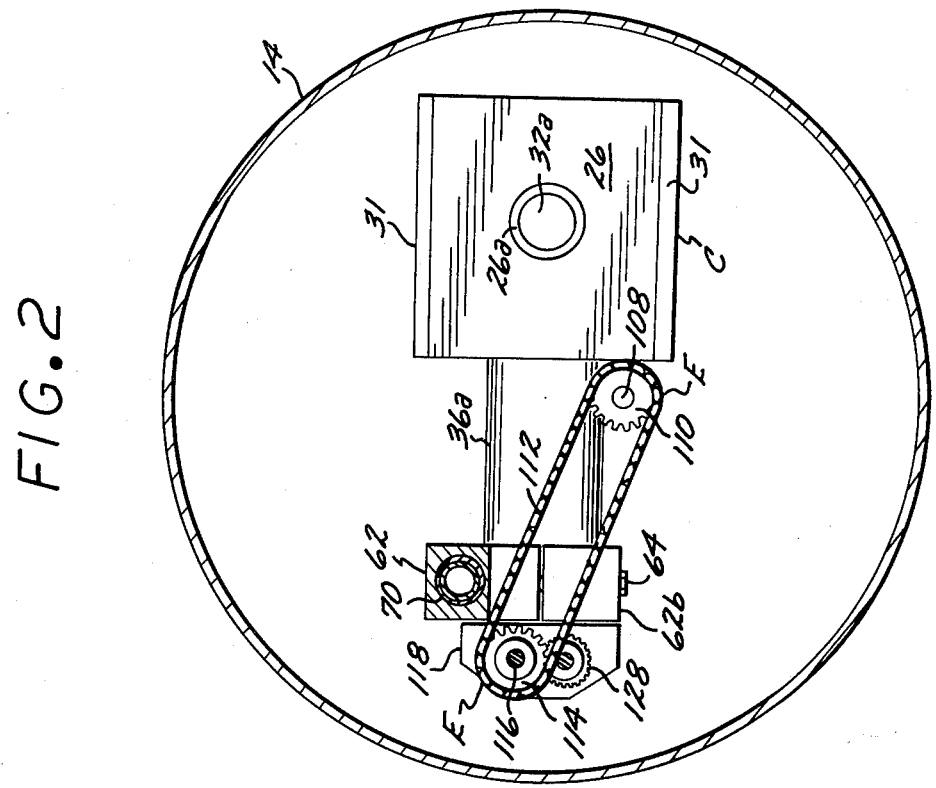
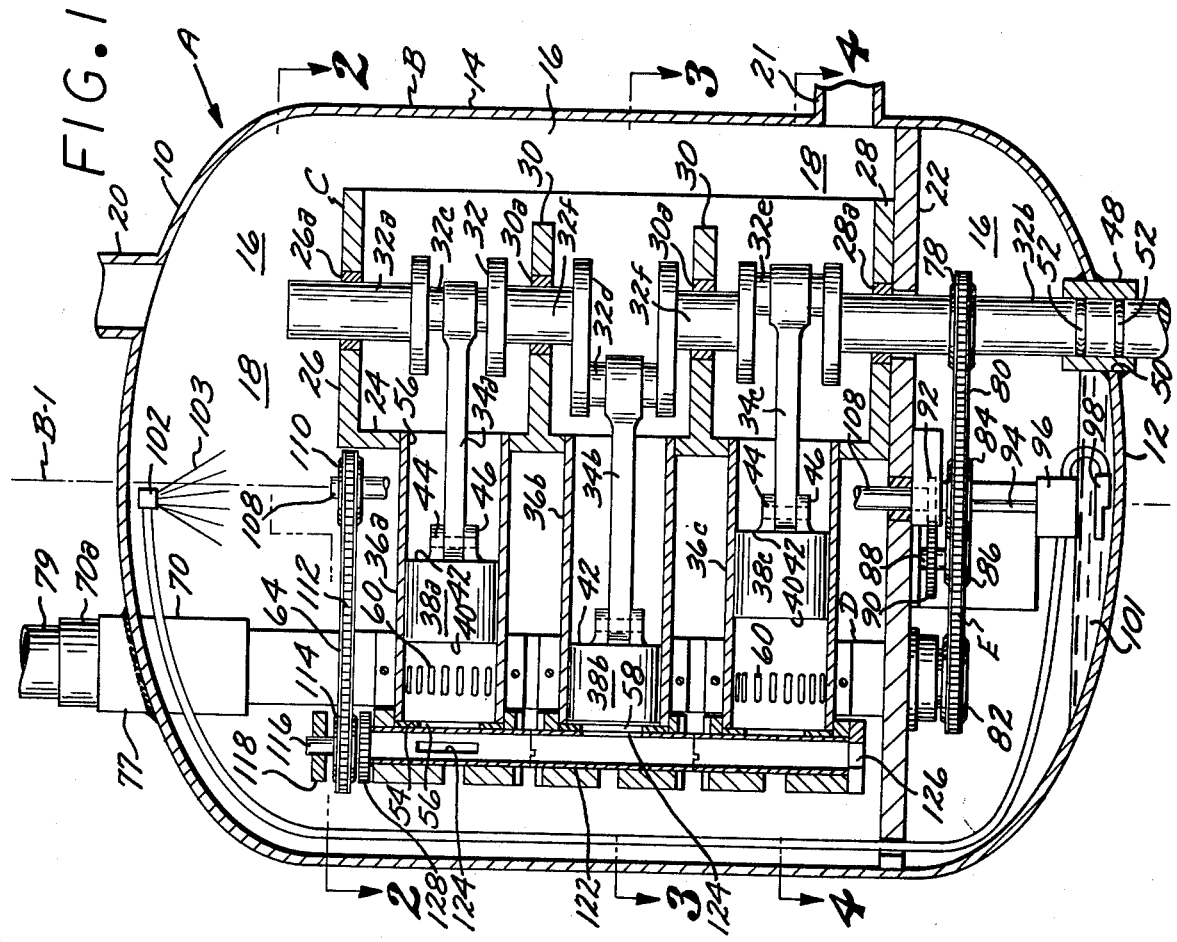

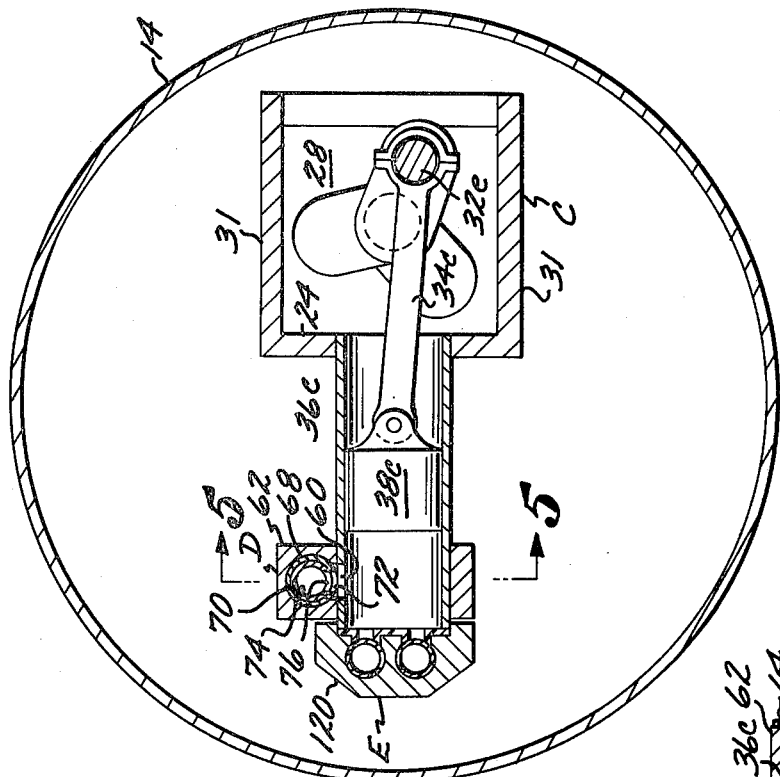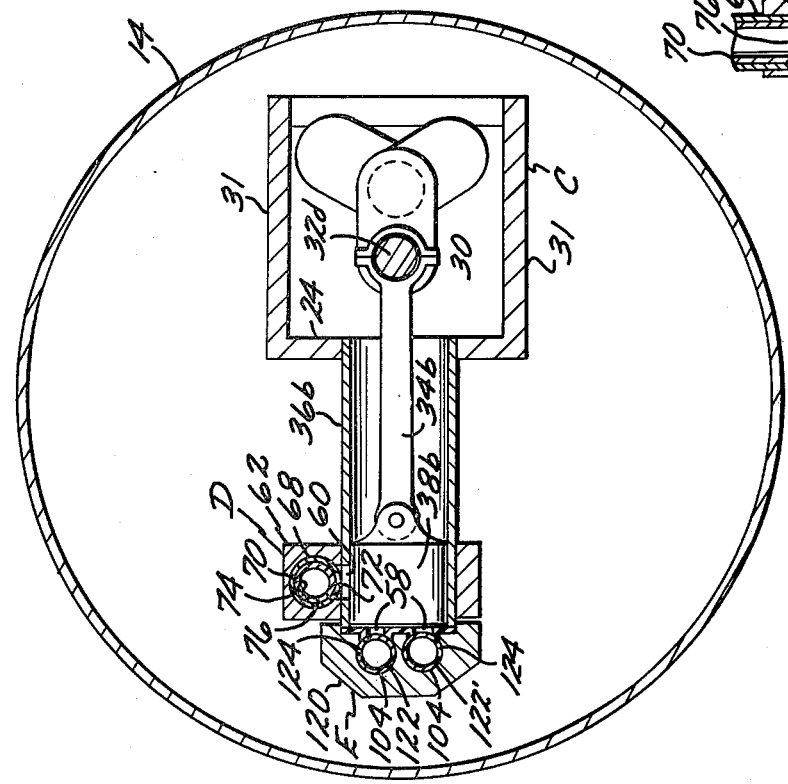

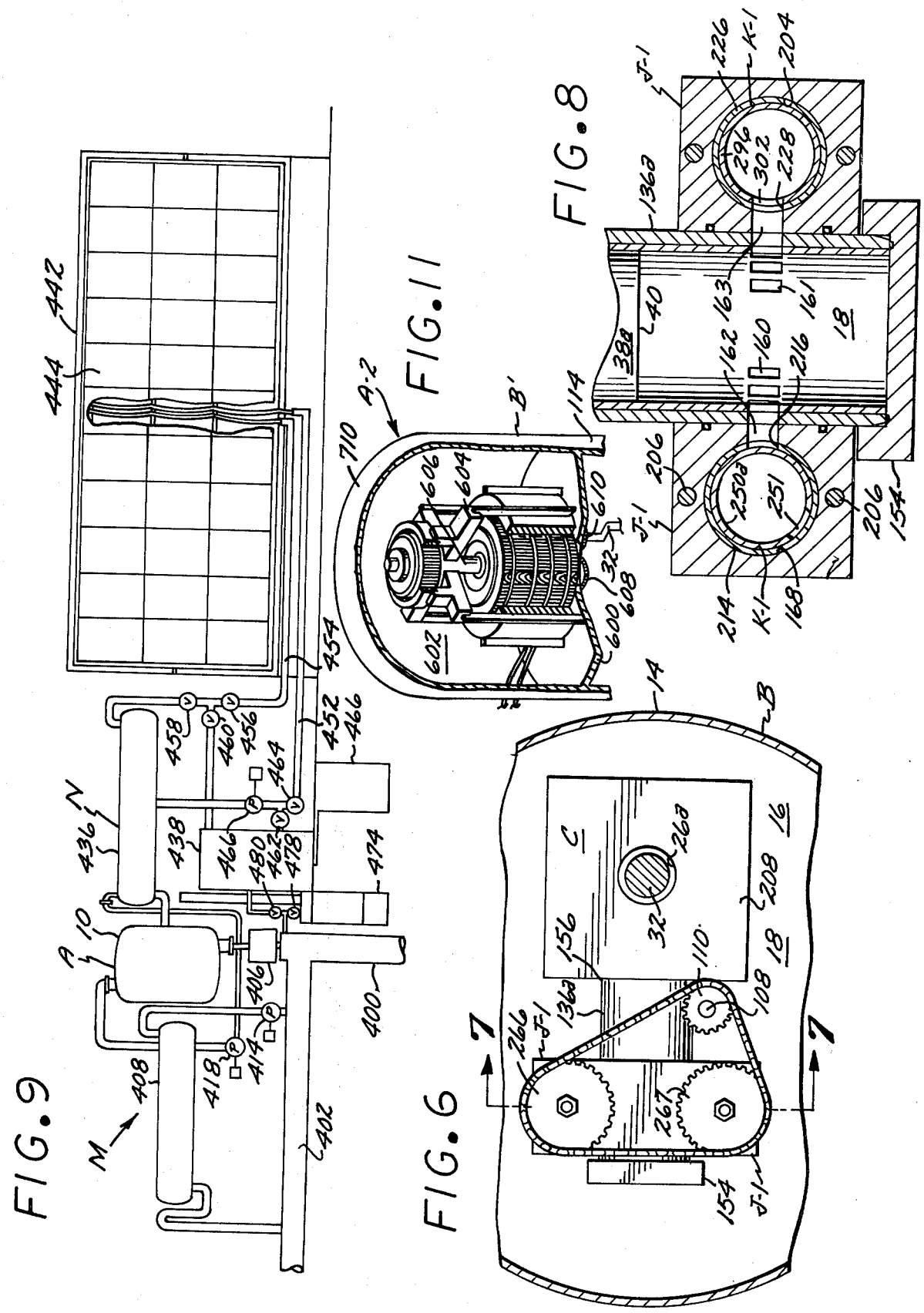

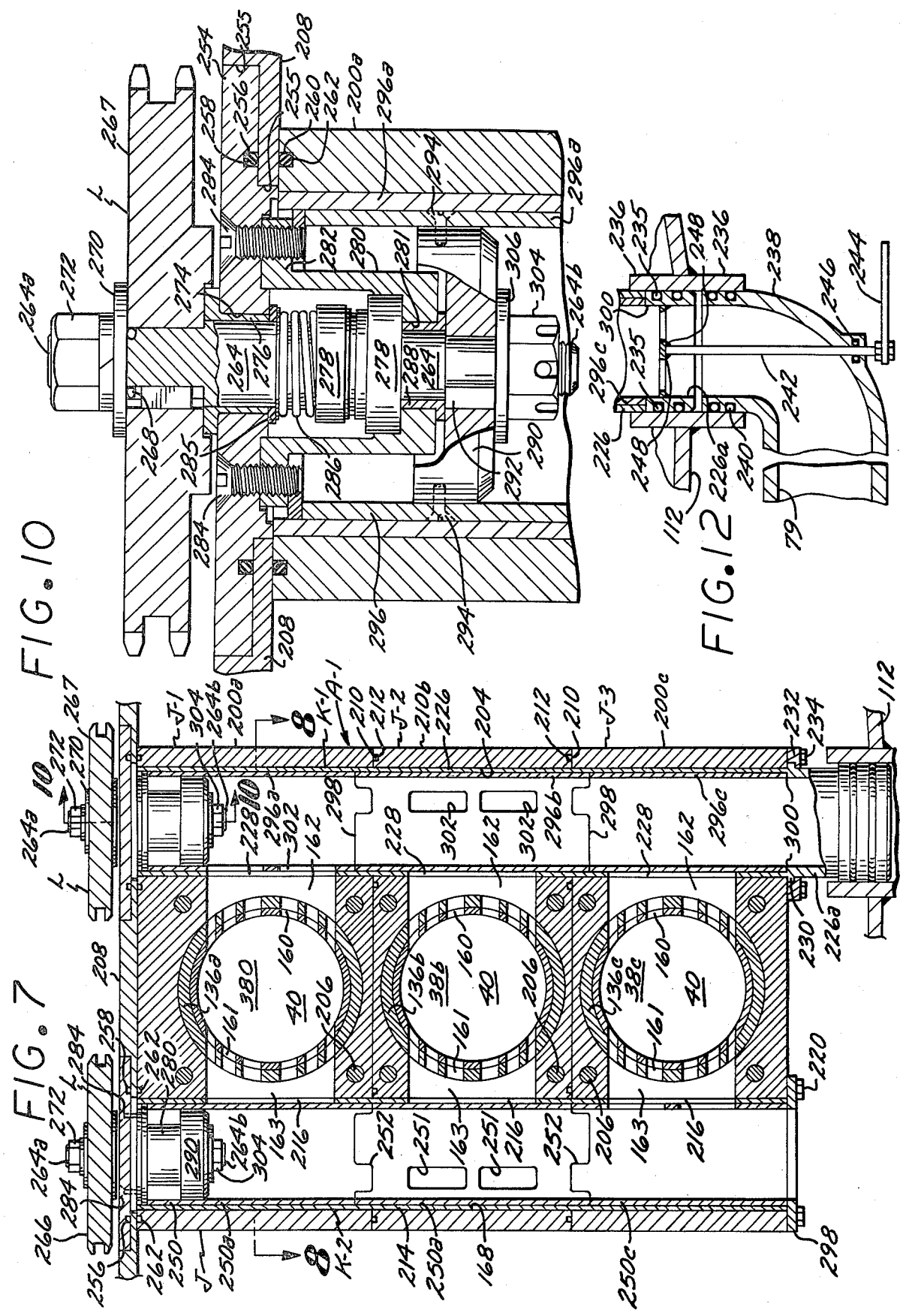

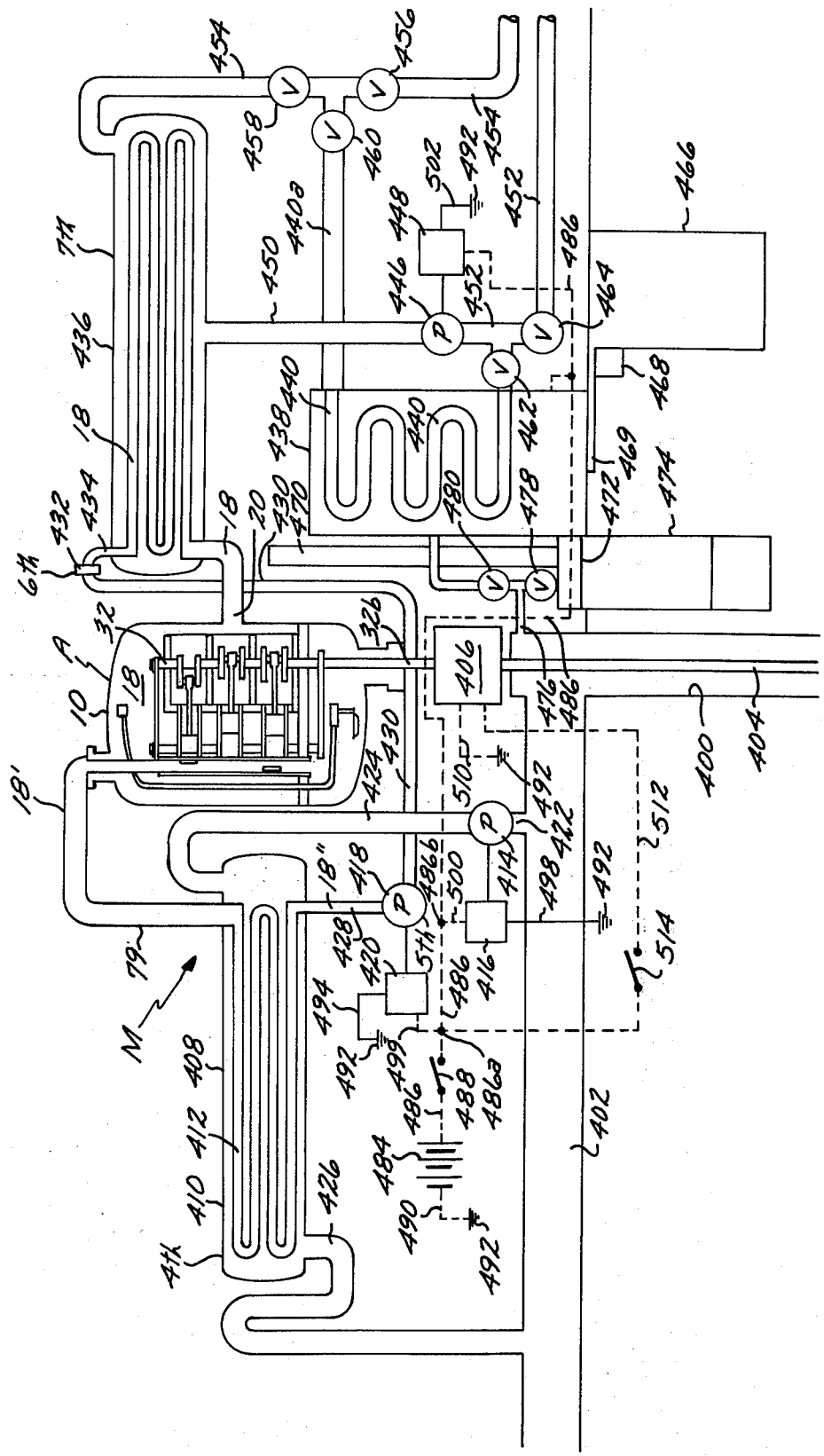

VAPOR POWERED ENGINE ASSEMBLY

CROSS-REFERENCE TO RELATED APPLICATION

The present invention is a continuation-in-part of my co-pending application Ser. No. 848,873 entitled "Power Generating Assembly and Method of Using Same" that was filed Nov. 7, 1977, now U.S. Pat. No. 4,156,343.

BACKGROUND OF THE INVENTION

1. Field of the Invention

Vapor Powered Engine Assembly.

2. Description of the Prior Art

In all areas of the world, with the exception of the Arctic and Anarctic regions, vast and inexhaustible quantities of heat exist in the ground, the ambient atmosphere, and in bodies of water such as lakes, rivers, oceans and the like, as well as from sunlight, that is free for the taking. The advantage of using such free sources of heat for power generating purposes in contrast to expensive and exhaustible hydrocarbon fuels such as oil and coal will readily be apparent.

However, prior to the filing of my previously identified application and the Vapor Actuated Power Generating Device disclosed in my previous U.S. Pat. No. 4,033,136 that issued July 5, 1977, the applicant has no knowledge of a practical apparatus that could conveniently and inexpensively transform this vast source of low temperature heat into energy for power producing purposes such as generating electricity.

A major object of the present invention is to provide an engine assembly capable of operating on solar energy or low temperature heat from natural occurring sources, but also when desired capable of operating from the burning of fuel such as coal, oil, wood, saw dust and the like.

Another object of the invention is to furnish an engine assembly particularly adapted for driving a pump for pumping well water, with the pumped well water serving not only for irrigation purposes but also for initially cooling the low pressure vapor discharged from the engine assembly, which vapor is further cooled and pressurized to return to the liquid state whereupon it is heated to transform to high pressure vapor to again power the engine assembly.

A still further object of the invention is to furnish an engine assembly in which the moving components are hermetically sealed within an enveloping shell having an interior completely free of dust and dirt, with the moving components when operating being continuously subjected to a spray of lubricating oil to minimize friction and wear, and the engine assembly as a result requiring a minimum of maintenance attention.

Yet another object of the invention is to provide an engine assembly in which the rate of rotation of the driving shaft is controlled by varying the back pressure on the discharging low pressure vapor.

A further object of the invention is to furnish an engine assembly that not only generates rotational power that may be used for any desired purpose, but sufficient power to drive the necessary pumps to pressurize and circulate the low pressure vapor to return the latter to the liquid state to again be recycled through the engine assembly.

Yet another object of the invention is to furnish an engine assembly that operates on low temperature naturally occurring heat that is free for the taking, and by so doing minimizing our dependence on oil and coal which year-by-year increase in price and decrease in availability.

An additional object of the invention is to furnish an engine assembly which when operating on natural occurring low temperature heat sources emits no pollutants into the atmosphere, and one that is capable of operating on waste heat from industrial installations and power plants, which waste heat in many instances poses a serious operational problem as it raises the temperature of the ambient atmosphere and natural occurring bodies of water to an undesirably high temperature.

SUMMARY OF THE INVENTION

The engine assembly of the present invention is capable of receiving high pressure vapor that results from the heating of a low boiling point liquid such as one of the various Freons, carbon dioxide or the like, and transforming a portion of the pressure of the vapor to rotational power prior to discharging the vapor in a low pressure state from the engine. The low pressure vapor so discharged is sequentially transformed to high pressure vapor and recycled through the engine to produce rotational power. The low pressure vapor discharged from the engine assembly may be directed to a condenser in which the temperature and pressure are maintained sufficiently low to secure a desired pressure difference between the high pressure and low pressure side of the engine assembly.

The engine assembly includes a pressure vessel, preferably of elongate shape, that is disposed with the longitudinal axis extending upwardly, and the vessel defining a confined space within the interior thereof into which high pressure vapor from a volatile, low boiling point liquid is discharged. A frame is provided that occupies a fixed position within the pressure vessel. A crankshaft that includes a plurality of throws is provided, with the crankshaft rotatably supported in the frame, and the crankshaft having a power producing end portion that projects through a seal defining opening in one end of the pressure vessel.

A number of spaced parallel cylinders are axially aligned with the throws of the crankshaft and supported in fixed transverse position within the pressure vessel. Each of the cylinders has first and second ends. The first end is closed by an end piece that has a first port therein, with the second end of each cylinder being opened and in free communication with the confined space and the high pressure vapor situated therein. Each cylinder has at least one second port in the side wall thereof adjacent the first end of the cylinder. A number of pistons are slidably mounted in the cylinders, with each of the pistons having first and second ends. A number of connecting rods are provided that pivotally connect the second ends of the pistons to the throws of the crankshaft most adjacent thereto.

A first endless chain belt is provided that engages first, second, third and fourth sprockets with the first sprocket mounted on the crankshaft and rotating therewith.

A first rotatable ported assembly is driven by one of the sprockets and sequentially establish communications between each of the second ports and a cooled heat exchange condenser from the time the piston associated with that second port has reached the second end of the cylinder, and is being moved towards the first end of the cylinder in a power stroke by the force of the high pressure vapor on the second end of the piston. Each of the first rotatable ported assemblies terminates communication between a second port and the cooled condenser when the piston associated with that second port approaches the first end of the cylinder in which it is slidably disposed and prior to the piston reversing its direction of movement to move in a return stroke towards the second end of the cylinder. The force exerted on each of the pistons as it moves from the second end of the cylinder associated therewith to the first end thereof is transferred through an associated connecting rod to one of the throws of the crankshaft to rotationally power the latter.

A second rotatable ported assembly is provided that is driven by one of the sprockets for sequentially establishing communication between the high pressure vapor within the confined space and the first port in each of the cylinders, during the time the piston in the cylinder moves from the first end thereof to the second end of the cylinders, with the first and second ends of each piston when it so moves being subjected to substantially equal pressure by the high pressure vapor. The movement of each piston as a result thereof requiring a minimum of work in moving from the first end of the piston to the second end of the piston in which it is slidably disposed.

The engine assembly in addition includes pump means that are driven by one of the sprockets and serves to discharge liquid lubricant over the moving portions of the engine assembly situated in the confined space during operation of the engine to produce rotational power from the crankshaft.

Heat for volatilizing the liquid to power the engine assembly may be from a natural occurring source or a solar panel in combination with a boiler assembly that burns any combustible material. When the engine assembly is used to pump well water, the pumped water is used not only for irrigation purposes but to initially cool the discharged low pressure vapor prior to the latter being further cooled and pressurized to return to the liquid state after which it is heated and recycled through the engine assembly.

BRIEF DESCRIPTION OF THE DRAWINGS

FIG. 1 is a longitudinal cross-sectional view of the engine assembly;

FIG. 2 is a first transverse cross-sectional view of the engine assembly taken on the line 2—2 of FIG. 1;

FIG. 3 is a second transverse cross-sectional view of the engine assembly taken on the line 3—3 of FIG. 1;

FIG. 4 is a third transverse cross-sectional view of the engine assembly taken on the line 4—4 of FIG. 1;

FIG. 5 is a fragmentary transverse cross-sectional view of the invention taken on the line 5—5 of FIG. 4;

FIG. 6 is a horizontal cross-sectional view of the shell and a top plan view of an alternate form of engine assembly;

FIG. 7 is a vertical cross-sectional view of the alternate engine assembly taken on the line 7—7 of FIG. 6;

FIG. 8 is a transverse cross sectional view of the alternate engine assembly taken on the line 8—8 of FIG. 7;

FIG. 9 is a side elevational view of the alternate engine assembly in combination with a solar panel and pump, which combination is used to pump water from a well for irrigating purposes;

FIG. 10 is a longitudinal cross-sectional view of the drive portion of one of the valve assemblies used in the alternate engine assembly;

FIG. 11 is a longitudinal cross-sectional view of the alternate engine assembly with the electric generator hermetically sealed within the housing;

FIG. 12 is a side elevational view of a second alternate form of the invention; and FIG. 13 is a portion of the view shown in FIG. 9 but enlarged to show the details thereof.

DESCRIPTION OF THE PREFERRED EMBODIMENT

The high vapor pressure actuated power generating engine assembly A as may best be seen in FIG. 1 includes an elongate vertically disposed pressure vessel B that has the longitudinal axis B-1 thereof situated in a vertically extending position. The pressure vessel B is illustrated in FIG. 1 as including a convex-concave top 10, a like bottom 12, and a cylindrical side wall 14. The top 10, bottom 12, and a cylindrical side wall 14 serve to define a confined space 16 into which a high pressure vapor 18 flows through a tubular inlet 20 that is preferably located in or adjacent to the top 10. Cooled high pressure vapor may be removed from the confined space 16 for reheating through a discharge outlet 21, best seen in FIG. 1, which outlet is located adjacent the bottom 12. The vessel B, as may best be seen in FIG. 1, has a transverse support 22 extending thereacross adjacent the bottom 12, with the support being of less width than the interior diameter of the vessel B.

A rigid frame C is situated within the vessel B and includes a vertical member 24, upper horizontal member 26, lower horizontal member 28 secured to support 22 and a number of intermediately disposed horizontal members 30. A pair of vertically extending members 31 are secured to the free edges of the horizontal members 26, 28, and 30 for reinforcing purposes. The upper and lower horizontal members 26 and 28 serve to support first and second aligned bearings 26a and 28a, with third aligned bearings 30a being supported by the intermediate horizontal members 30. A crankshaft 32 is provided that has a first end portion 32a that is journaled in the first bearing 26a and a second end portion 32b that is journaled in the second bearing 28a. The crankshaft 32 as may be seen in FIG. 1 is illustrated as having first, second and third throws 32c, 32d and 32e that are disposed 120 degrees apart. The crankshaft 32 also includes intermediate portions 32f that are journaled in the third bearings 30a as shown in FIG. 1.

First, second and third connecting rods 34a, 34b and 34c are movably connected to the first, second and third throws, 32c, 32d and 32e. First, second and third cylinders 36a, 36b and 36c are provided that are held in fixed positions within the pressure vessel B by frame C and axially aligned with the first, second and third throws 32c, 32d and 32e. First, second and third pistons 38a, 38b and 38c are slidably mounted in the first, second and third cylinder 36a, 36b and 36d. Each of the pistons 38a, 38b and 38c has a first end 40 and a second end 42, with each second end having a pair of laterally spaced lugs 46 projecting therefrom between which a wrist pin 44 extends. Each wrist pin 44 is pivotally connected to one of the connecting rods 34a, 34b, and 34c. An opening 50 is formed in the bottom 12 of the pressure vessel B, and has a tubular sleeve 48 welded or otherwise secured thereto, with the sleeve being vertically disposed and axially aligned with the second end portion 32b of the crankshaft 32. The end portion 32b of the crankshaft extends through the tubular sleeve 48, with the crankshaft having sealing rings 52 mounted thereon that are in rotatable sealing contact with the interior of the sleeve. The first, second and third cylinders 36a, 36b, and 36c each have a first closed end 54, a second open end 56 that communicates with the confined space 16, and the first closed end having a first elongate port 58 therein, with the portion of each cylinder adjacent the first closed end having a number of circumferentially spaced second ports 60 therein. A number of blocks 62 are provided, with each block as can best be seen in FIG. 5 extending around the exterior of one of the cylinders adjacent the first closed end 54 thereof.

Each block 62, as best seen in FIG. 5, includes a first portion 62a and second portion 62b that defines semicircular surfaces on the interior thereof, that engage the exterior surface of the cylinder, with the first and second portions being removably secured to one another by bolts 64. Each block 62 forms a part of a first valve assembly D that is shown in FIG. 5. Each of the second block portions 62b as shown in FIG. 5 has a first transverse passage 66 therein that communicates with a vertically extending bore 68 in which a first tubular member 70 is rotatably and adjustably mounted, and passage 66 also being in communication with second port 60. The first tubular member 70 has a number of longitudinally spaced second openings 72 therein of substantial width that may be wholly or partially brought into registry with the first passages 66 by rotatable adjustment of the first tubular member for reasons that will later be explained. A first tube 74 rotatably and sealingly mounted in the first tubular member 70 with the first tube 74 having a number of longitudinally spaced third ports 76 therein each of which is offset from the other by substantially 120 degrees. As the first tube 74 is rotated each of the third ports 76 is sequentially brought into registry with an aligned first passage 66, second opening 72 and first port 60. Tubular member 74 has a first sealed lower end 74a and a second open end (not shown) that is rotatably disposed in a tubular assembly 77 that extends through top 10 and is welded or otherwise secured thereto. Assembly 77 is connected to a conduit 79 through which low pressure vapor 18 is discharged to be transformed to high pressure vapor by heat from an auxiliary source such as the sun, the earth or the like (not shown), with the high pressure vapor being recycled into confined space 16 through inlet 20. The vapor may be Freon 22 or other vapor from a suitable low boiling point liquid.

A first sprocket 78 is rigidly secured to the second end portion 32b of crankshaft 32 with the sprocket engaging an endless link belt 80. The belt 80 also engages second, third and fourth sprockets 82, 84 and 86, with the second sprocket 82 being of substantially the same diameter as the first sprocket 78. The fourth sprocket 86 is secured to a first shaft 88 that is journalled in support 22 and depends therefrom, which shaft has a first gear 90 rigidly mounted thereon. First gear 90 engages a second gear 92 secured to a second shaft 94 that drives an oil pump 96 that has an intake 98 adjacent the bottom 12 of the pressure vessel B on which a pool 101 of oil rests. The oil pump 96 has a discharge tube 100 extending therefrom that terminates in a nozzle outlet 102 adjacent the top 10 of the pressure vessel B.

As the invention operates lubricating oil is withdrawn from a pool 101 thereof that rests on the bottom 12 by pump 96 and discharged as a spray 103 to lubricate the moving components, with oil from the spray returning by gravity to the pool. The third sprocket 84 is secured to a third shaft 108 that is rotatably supported in the frame C and is disposed parallel to the crankshaft end portion 32a and 32b as may be seen in FIG. 1. The second sprocket 82 is mounted on first tubular member 70 that forms a part of the first valve assembly D shown in part in FIG. 5.

A second valve assembly E includes a fifth sprocket 110 secured to a third shaft 108 adjacent the crankshaft end portion 32a. Fifth sprocket 110 engages a second endless chain belt 112 that extends to a sixth sprocket 110 secured to a third shaft 116 which shaft is rotatably supported in a fixed position in confined space 116 by conventional means (not shown).

An elongate block 120 is provided as shown in FIG. 3 that extends longitudinally along the first ends 54 of the first, second and third cylinders 36a, 36b and 36c, and is secured thereto by conventional means, which block 120 is illustrated in FIG. 3 as having two parallel vertically spaced transverse bores 104 therein that communicate with the first elongate ports 58 as shown in FIG. 3.

Two elongate first and second tubes 122 are rotatably and sealingly mounted in the bores 104, with the tubes having lower open ends 126 that are at all times in communication with the high pressure vapor 18 in confined space 16. The third shaft 116 also has a seventh sprocket 128 mounted thereon that rotates concurrently with the fifth sprocket 114. The seventh sprocket 128 is secured to an upper end of one of the tubes 122. The seventh sprocket 128 is in toothed engagement with a second seventh sprocket 128 secured to the upper end of the other tube 122. As sixth sprocket 114 rotates second shaft 116, the two sprockets 128 rotate in opposite directions as do the first and second tubes 122.

The first and second tubes 122 each have staggered sets of longitudinally spaced fourth ports 124 therein, with each set of fourth ports being concurrently brought into registry with the first port 58 associated therewith as the first and second tubes 122 rotate in opposite directions.

The operation of the invention is as follows. Each of the first, second and third pistons 38a, and 38c has a second end 42 that is at all times exposed to the high pressure vapor 18 in confined space 16. This high pressure vapor at all times tends to move pistons 38a, 38b and 38c to the left. Each piston 38a, 38b and 38c when it starts to move from a second end 56 of the cylinder 36a, 36b and 36c towards the first end 54 thereof is moving through a power stroke to rotate the crankshaft 32. To obtain maximum rotative power from crankshaft 32 it is desirable to have a maximum differential in pressure between the second ends 42 and first ends 40 of the pistons.

This differential in pressure is achieved by actuation of the first valve assembly D previously described. The tubular member 70 is rotatably adjustable by use of the outwardly disposed portion 70a shown in FIG. 1. When tubular member 70 is rotatably adjusted to have the second openings 72 in full registry with second ports 60 and openings 66, the power generating device A will operate at maximum speed, for vapor on the left side on the pistons 38a, 38b and 38c will be expelled during a power stroke into first tube 74 with a minimum of resistance.

However, when the second openings 72 are adjusted out of full registry with second ports 60 the effective transverse area of the passages afforded thereby to third ports 76 is reduced, and a back pressure develops in the cylinders 36a, 36b and 36c in the portions thereof to the left of the first ends 40 of the pistons 38a, 38b and 38c. This increase in back pressure results in a lessened differential in pressure of vapor on the first and second ends 40 and 42 of pistons 38a, 38b and 38c with a corresponding slow down in the rate of rotation of crankshaft 32. From the above description, it will be seen that the rate of rotation may be controlled by adjustably rotating the first tubular member 70 in the bore 68.

During the power strokes of the pistons 38a, 38b and 38c, the crankshaft 32 through transmission means previously described is rotating the fifth sprocket 110, which fifth sprocket drives the second chain belt 112 that is in engagement with the sixth sprocket 114.

Rotation of sixth sprocket 114 results in concurrent rotation of first and second gears 128 and first and second tubes 122. Rotation of first and second tubes 122 is at such a rate and so timed that as first, second and third pistons 38a, 38b and 38c sequentially complete power strokes, two of the fourth ports 124 move into communication with the first port 58 associated with the piston completing the power stroke. High pressure vapor 18 flows upwardly through open ends 126 of first and second tubes 122 and then discharge through fourth ports 124 and first ports 58 into the first, second and third cylinders 36a, 36b and 36c to the left of first, second and third pistons 38a, 38b and 38c as viewed in FIG. 1.

The first, second and third pistons 38a, 38b and 38c as they sequentially move from first ends 54 of first, second and third cylinders 38a, 38b and 38c to second ends 56 thereof have high pressure vapor 18 of the same magnitude on the first and second ends thereof, and this return stroke is accomplished with a minimum expenditure of energy. The energy for the return stroke of each piston 38a, 38b and 38c is supplied by the momentum of the rotating crankshaft 32.

In FIGS. 3 and 4 it will be seen that the first valve assembly D is disposed inwardly from the first ends 54 of first, second and third cylinders 36a, 36b and 36c. The first, second and third pistons 36a, 36b and 36c prior to completing a power stroke as they move to the left as viewed in FIG. 4, move over the second ports 60 and obstruct the same. The second valve assembly E is closed on each of the first, second and third cylinders 36a, 36b and 36c until the piston 38a, 38b and 38c therein has completed a power stroke. As a result there is vapor 18 trapped in the left hand end of each of the first, second and third cylinders 36a, 36b and 36c after the pistons 38a, 38b and 38c move past the second ports 60, with this trapped vapor being compressed and emitting heat. The compressed vapor tends to expand after one of the first, second and third pistons 38a, 38b and 38c has completed a power stroke, and in so doing exerting force on the first ends 40 of the pistons that urges them towards the second ends 56 of the cylinders 36a, 36b and 36c. To permit the sequential compression and expansion of the trapped vapor 18 as above described, the rotation of the first and second tubular members 122 is preferably so timed that the second valve assembly E only starts to open after the compressed vapor in the cylinders 36a, 36b and 36c has expanded to a pressure that is substantially equal to that of the high pressure vapor 18 within pressure vessel B. The compression of the trapped vapor in the first, second and third cylinders 36a, 36b and 36c as the first, second and third pistons 38a, 38b and 38c approach the end of a power stroke has a cushioning effect, and the pistons are not subjected to sudden shock in reversing their direction of movement. Thus, the reversal of movement of the first, second and third pistons 38a, 38b and 38c is achieved without appreciable loss of power on crankshaft 32, for the loss of power on the crankshaft as the trapped vapor is compressed is regained as the compressed vapor expands.

An alternate form A-1 of the power generating device is shown in FIGS. 6, 7, 8 and 10 of the drawings that operates in substantially the same manner as the previously described form A, and differs from the latter in the positioning of the first valve assembly D for exhausting vapor and the second valve assembly E for equalizing high pressure vapor 18. The assemblies D and E as may best be seen in FIG. 7 are replaced by a block assembly J that supports the first, second and third cylinders 136a, 136b and 136c in horizontal vertically spaced relationship. The first, second and third cylinders 136a, 136b and 136c have closed first ends 154 and second open ends 156. The second open ends 156 are adjacently disposed to the frame C as shown in FIG. 6.

The first, second and third cylinders 136a, 136b and 136c each have two sets of oppositely disposed first and second ports 160 and 161 therein that communicate with first and second passages 162 and 163 defined in the block assembly J. The first and second passages 162 and 163 as may be seen in FIG. 7 are in communication with first and second parallel laterally spaced vertically extending bores 204 and 168 defined in block assembly J. The block assembly J is illustrated in FIG. 7 as being formed from first, second and third vertically disposed sections J-1, J-2 and J-3 that are held one above the other in abutting relationship by conventional means such as bolts 206. The upper block assembly J-1 as may best be seen in FIGS. 7 and 10 has a horizontal plate 208 rigidly secured thereto by conventional means (not shown). The first, second and third block sections J-1, J-2 and J-3 interlock with one another by downwardly projecting tongues 210 that engage adjacently disposed grooves 212 disposed therebelow as may best be seen in FIG. 7.

The first valve assembly K-1 that controls discharge of vapor from first, second and third cylinders 136a, 136b and 136c during the major portion of each power stroke includes a first tubular member 226 rotatably supported in first bore 204. Tubular member 226 has a number of longitudinally spaced first openings 228 therein, that by rotation of the first tubular member may be brought into whole or partial registry with the first passages 162 and first ports 160 to the right of the first, second and third cylinders 136a, 136b and 136c as viewed in FIG. 7. The first tubular member 226 has a flange 230 that projects outwardly from the lower portion thereof, with this flange being slidably supported in a recessed ring 232 that is secured to the right-hand side of the block section J-3 as viewed in FIG. 7 by bolts 234.

The first tubular member 226 as shown in FIG. 12 has an extension 226a projecting downwardly therefrom on which sealing rings 235 are mounted that sealingly engage the interior surface of a vertical cylindrical member 236 that projects downwardly through the bottom 112 of the pressure vessel B as shown in FIG. 11. An L-shaped tubular fitting 238 is provided that supports sealing rings 240 that engage the lower interior surface of the cylindrical member 236.

A rod 242 is provided that has a handle 244 mounted on the lower end thereof, with the rod extending upwardly through a rotatable seal 246 defined in the L-shaped tubular fitting 238. The upper extremity of the rod 242 is secured to a cross-bar 248 that is secured to the extension 226a. By use of the handle 244, the rod 242 may be pivoted to rotate the first tubular member 226, to bring the first openings 228 into either full registry or partial registry with the first passages 162 for reasons that will later be explained in detail. The L-shaped fitting 238 is held in a fixed position relative to bottom 112 of pressure vessel B by conventional means (not shown). Fitting 238 is connected to conduit 79.

The first valve assembly K-1 includes a first tube 296 best seen in FIG. 7, which tube is defined by first, second and third tube sections 296a, 296b and 296c that are removably joined together by tongue and groove connections 298. The first, second and third tube sections 296a, 296b and 296c have longitudinally and circumferentially spaced third ports 302 formed therein, which third ports are brought sequentially into registry with the first passages 162 as the first tube 296 rotates, and the rotation of the first tube being so timed that the third ports communicate with the first passages 162 as the pistons in the first, second and third cylinders 136a, 136b and 136c complete the major portion of a power stroke.

The second valve assembly K-2 serves to admit high pressure vapor 18 from confined space 16 into each of the cylinders 136a, 136b and 136c as each piston 38a, 38b and 38c therein completes the major portion of a return stroke. Second bore 168 has a second tubular member 214 mounted in a fixed position therein, with the tubular member having a number of longitudinally spaced second openings 216 therein that communicate with second passages 163 as shown in FIG. 7.

A first ring-shaped member 218 is secured to the bottom of third block J-3 as shown in FIG. 7 in such a position that the lower end of second tubular member 214 rests thereon. The ring-shaped member 218 is secured to the third block section by bolts 220 or other suitable fastening means.

A second tube 250 is rotatably supported in second tubular member 214 as may be seen in FIG. 7, with the second tube having a number of longitudinally and circumferentially spaced fourth ports 251 therein that sequentially move into registry with the second passages 163 and second ports 161 as the pistons 38a, 38b and 38c complete the major portions of the return strokes. The second tube 250 is rotated by one of the drive assemblies L.

The second tube 250 is preferably defined by first, second and third sections 250a, 250b and 250c that are formed with tongue and groove defining ends 252 that removably interlock as shown in FIG. 7, and the sections as a result thereof rotating as an integral unit. Each of the sections has at least one of the fourth ports 251 therein. The drive L for the first valve assembly K-1 includes a first sprocket 267 and the drive for a second valve assembly K-2 includes a second sprocket 266.

Each of the drive assemblies L includes a flat circular support 254 that snugly and slidably engages a conforming recess 255 extending downwardly in the plate 208 with the support 254 have a circular upwardly extending recess 256 formed in the lower surface thereof in which a resilient sealing ring 258 is disposed that pressure contacts the upper surface of the plate 208. A circular groove 260 extends downwardly from the upper surface of the first block section J-1 as shown in FIG. 10 and has a sealing ring 262 therein that pressure contacts the lower surface of the plate 208. Each drive assembly L includes a driven shaft 264 as may be seen in FIG. 10 that has an upper threaded end 264a and lower threaded end 264b. The drive L for the first valve assembly K-1 includes a first sprocket 267 that is mounted on the upper portion of the driven shaft 264 and is secured thereto by a longitudinally extending key 268.

The upper end portion of the shaft 264 has a washer 270 encircling the same that rests on the upper surface of the first sprocket 267 with the washer being forced downwardly into pressure contact with the sprocket by a first nut 272 that engages the upper threaded end 264a of the shaft. The support 254 has a centered transverse bore 274 therein in which a sleeve bearing 276 is rotatably supported, with the bearing being in rotatable engagement with the shaft 264. The shaft 264 has a rotatable seal 278 mounted thereon which seal is in abutting contact with a horizontal surface of a cup-shaped mounting 280 which mounting has an outwardly extending flange 282 on the upper portion thereof, with the flange secured to the support 254 by cap screws 284 that extend downwardly therethrough to engage tapped bores formed in the flange 282. A helical spring 286 encircles the driven shaft 264, with the upper portion of the spring being in abutting contact with a shaft encircling washer 285 that bears against the lower interior portion of the support 254 and the lower portion of the spring contacting the seal 278. The seal 278 has the lower portion thereof in abutting contact with an inwardly extending part of the cup-shaped mounting 289, which mounting has a centered downwardly extending bore 281 formed in the inwardly extending port in which a second sleeve bearing 288 is disposed. The shaft 264 below the sleeve bearing 288 as may be seen in FIG. 10 extends through a centered bore formed in a circular resilient member 290 that snugly and slidably engages the interior surface of a second tube 296. The circular member 290 is held in a nonrotatable position relative to the driven shaft 264 by a longitudinally extending key 292. The first tube 296 as may be seen in FIG. 7 is defined by first, second and third tube sections 296a, 296b and 296c that by tongue and groove connections 298 are joined to one another and as result rotate as an integral unit. Screws 294 extend through the first section 296a of second tube 296 as can be seen in FIG. 10, and as a result when the driven shaft 264 is rotated by a first sprocket 267 secured thereto, the first tube 296 rotates concurrently therewith. The extension 266a as shown in FIG. 12 defines a lip 300 that rotatably supports the lower end of the third tube section 296c.

The first, second and third sections 296a, 296b and 296c each have third ports 302 that are so circumferentially offset from one another that they are in sequential communication with one of the first openings 228, first passages 162 and first ports 160 to the right of the cylinders as viewed in FIG. 7 to permit low pressure vapor in the cylinders to exhaust to pipe 79 shown in FIG. 11. By moving the handle 244 shown in FIG. 11 the first tubular member 226 may be rotated to place the first openings 228 in but partial registry with the first passages 162 to the right of the first, second and third cylinders 136a, 136b and 136c as shown in FIG. 7. This operation results in the flow of vapor 18 adjacent the first ends 40 of the first, second and third pistons 38a, 38b and 38c being restricted as it flows from first, second and third cylinders 136a, 136b and 136c and a back pressure building up in the cylinders as a result thereof. The differential in pressure between the first and second ends 40 and 42 of the pistons 38a, 38b and 38c is reduced and the speed of rotation of the crank shaft 32 is reduced. The first form of engine A-1 will operate at maximum speed when the handle 244 shown in FIG. 11 is moved to place first openings 228 in full registry with first passages 162 to the right of first, second and third cylinders 136a, 136b and 136c as viewed in FIG. 7. The lower end of shaft 264 as may be seen in FIG. 10 has a nut 304 and washer 306 mounted on the lower end 364b thereof.

The first and second valve assemblies K-1 and K-2 of the second form of the power generating device A-1 are driven concurrently with rotation of crankshaft 32 by an endless chain link belt 308 that engages the fifth sprocket 110 and the sprockets 266 and 267 as shown in FIG. 6. The second form A-1 operates in the same manner as the first form A of the power generating device and has the same construction as the first form other than as above noted.

In FIG. 8 it will be noted that the first and second ports 160 and 161 are disposed a substantial distance from the closed end 154 of first cylinder 136a, and this is true of the second and third cylinders 136b and 136c although not illustrated. As the piston 38a shown in FIG. 8 moves towards the closed end 154 of first cylinder 136a in a power stroke, vapor 18 between the first end 40 of first piston 38 and closed end 154 will discharge through first port 160 into second valve assembly K-1. Such discharge will continue until the first end 40 of first piston 38a has moved past first port 160 in approaching closed end 154 whereupon flow to the first ports 160 is terminated. The vapor 18 remaining in the cylinder 136a is compressed as the first piston 38a completes a power stroke and subsequently expands as the first piston moves away from the closed end 154. When the first end 40 of first piston 38a in a return stroke moves past the second port 161, the second valve assembly K-2 shown in FIG. 8 has rotated sufficiently to establish communication between fourth port 251 and second port 161 for pressurized vapor 18 to flow into first cylinder 136a to equalize vapor pressure on the first and second ends 40 and 42 of first piston 38a. The compression and expansion of vapor that is trapped in each of the first, second and third cylinders 136a, 136b and 136c as above described smoothes out the operation of the alternate form A-1 of the power generating device, and this is also true of the first form A. Although I have referred to first and second ports 160 and 161 it will be seen in FIG. 8 that each port is actually a number of circumferentially spaced ports. The second valve assembly is so located and so operated that each fourth port 251 starts to communicate with a second port 161 when the compressed trapped vapor in first cylinder 136a has expanded to substantially the pressure of vapor 18 in pressure vessel B. The second and third cylinders 136b and 136c with their associated second and third pistons 38b and 38c operate in the same manner as above described for first cylinder 136a.

The well pumping assembly M as can be seen in FIG. 9 is illustrated as disposed above a well bore 400, which bore at the top has a water discharge line 402 extending substantially horizontally therefrom. A drive shaft 404 extends downwardly in the well bore 400 to a downhole pump (not shown), with the upper end of the drive shaft being connected to a shaft of an electric generator 406, which generator is in turn connected to the lower end 32b of the crankshaft 32.

A heat exchanger 408 is provided that includes a confined space defining shell 410, preferably of elongate shape, and that has a tubular coil 412 situated within the interior thereof. The upper end of the tubular coil 412 is connected to the conduit 79 that forms a part of the power generating assembly A. The assembly M includes a first pump 414 that is driven by a first electric motor 416. A second pump 418 is also provided that is driven by a second electric motor 420. The suction side of the first pump 414 is connected by a first conduit 422 to the water discharge line 402. A second conduit 424 extends from the discharge of the first pump 414 to the upper interior portion of the shell 410 as may be seen in FIG. 9.

The lower interior portion of the shell 410 is connected to a third conduit 426 that communicates with the water discharge line 402. The suction side of the second pump 418 is connected by a fourth conduit 428 to a lower portion of the tubular coil 412, with the discharge of the pump 414 having a fifth conduit 430 extending therefrom. An expansion valve 432 forms a part of a heating and expansion assembly N. The expansion valve 432 is connected to the fifth conduit 430 and to a tubular expansion coil 434 situated within the interior of a second confined space defining shell 436. A hot water heater 438 is provided as shown in FIG. 9 that has a tubular coil 440 situated within the interior thereof. The assembly M as illustrated in FIG. 9 includes a conventional present-day solar panel 442 as a source of heat that has a number of spaced tubes 444 situated within the confines of the panel that are heated by the sun's rays. The assembly M includes a third pump 446 that is driven by a third electric motor 448.

The lower interior portion of the shell 436 is in communication with a downwardly extending sixth conduit 450 that is connected to the suction side of the third pump 446. The discharge of the third pump 446 is connected to a seventh conduit 452 that is in communication with the tube 444. Water after it circulates through the tubes 444 discharges into an eighth conduit 454 that extends to the upper interior portion of the second shell 436. An extension 440a of the tubular coil 440 is connected to the eighth conduit 454 as shown in FIG. 9. First and second valves 456 and 458 are interposed in the eighth conduit 454 on opposite sides of the junction of extension 440a therewith. The tubular extension 440a has a third valve 460 situated therein as shown in FIG. 9. The tubular coil 440 on the lower end thereof is connected to the sixth conduit 450 as may be seen in FIG. 13, with the coil having a fourth valve 462 in the lower portion thereof. The seventh conduit 452 has a fifth valve 464 therein.

A fuel storage unit 466 forms a part of the assembly M, and may be either adapted to hold diesel fuel, waste combustible products, or other burnable hydrocarbon materials. When diesel oil is to be used in the fuel, the unit 466 includes a power driven fuel pump 468 that discharges the fuel to a burner 469 that heats the hot water heater 438. Gases of combustion resulting from the burning of the fuel flow to an upwardly extending flue 470 after passing through a scrubber 472 that is located in the upper portion of a holding tank 474. A ninth conduit 476 is in communication with a well bore 400 and has first and second laterals 476a and 476b extending therefrom, with the first lateral being in communication with the water heater 438 and the second lateral 476b communicating with the scrubber 472. Sixth and seventh valves 478 and 480 are located in the first and second laterals 476a and 476b.

An independent source of electric power 484 is provided as may be seen in FIG. 9 that is used in the startup of the invention M, which source of power has one terminal thereof connected to a conductor 486 that has a manually operated switch 488 therein. The second terminal of the source of electric power 484 is connected to a conductor 490 that extends to ground 492. A first terminal of electric motor 416 is connected to a conductor 498 that extends to ground 492. The second terminal of electric motor 416 is connected to a conductor 500 that extends to junction point 486b in conductor 496. The second motor 420 has the first terminal thereof connected to a conductor 494 that extends to ground 492 with the second terminal of the motor being connected to a conductor 499 that extends to a junction point 486a in conductor 486. The third electric motor 448 has a first terminal connected to a conductor 502 that extends to ground 492, and the second terminal connected to the conductor 486.

When the switch 488 is closed, the electric motors previously identified are energized to drive the first, second and third pump 414, 418 and 446.

The high pressure vapor 18 used in actuating the first and second power generating devices A and A-1 result from the volatilization of a low boiling point liquid such as Freon 22. The operation of the power generating devices A and A-1 is substantially the same when used in the assembly M shown in FIG. 9, and as a result only the operation of a first form A of the power generating device will be described.

When the power generating device A is operating, low pressure vapor 18' will discharge to the conduit 79, with this low pressure vapor being at approximately 100 pounds pressure per square inch when the vapor is Freon 22, and the temperature is substantially 60° F. within the interior of the shell pressure vessel B. When switch 488 is closed, the first pump 414 is driven by first motor 416 to discharge cool well water from discharge pipe 402 to heat exchanger 408, and as low pressure vapor 18' flows through the tubular coil 412 it is cooled. Water after flowing through the shell 410 to cool the tubular coil 412 flows into the conduit 426 to return to the discharge line 402. The low pressure vapor 18' in flowing through the tubular coil 412 is cooled sufficiently to condense to a low pressure liquid 18" that is pumped by the first pump 414 through the conduit 430 to the expansion valve 432. The lower pressure liquid 18" when it discharges through the expansion valve 432 is transformed to high pressure vapor 18 due to being heated within the heat exchanger N. The third pump 446 recirculates water or other heat transferring liquid through the solar panel 442 to flow through the conduit 452 into the interior of the shell 436 of the heat exchanger assembly N as shown in FIG. 13. The solar panel 442 should be of such size that when the sun is shining the water or liquid flowing through the tubes 444 will be at a temperature of substantially 150 degrees Fahrenheit when it returns to the interior of the shell 436. If Freon 222 is used as a working fluid, the high pressure vapor discharged from the heat exchanger N to the power producing device A as shown in FIG. 9, will be approximately 380 pounds per square inch. The working pressure of the vapor in the power producing device A will be the difference between the pressure on the first and second ends 40 and 42 of the pistons 38a, 38b and 38c which is approximately 280 pounds per square inch.

During the summer months a six hundred square feet of collector area on the solar panel 432 should in most areas of the country be sufficient to heat the water or other heat transfer liquid flowing through the tubes 444 to 150° F. When the solar panel 442 is relied on for heating the liquid flowing to the heat exchanger assembly N, the valves 456, 464 and 458 will be open to permit continuous recirculation of the heating liquid. Valves 460 and 462 will be closed.

On cloudy or cold days when the solar panel 442 would not provide sufficient heat to heat the water flowing to the heat exchanger assembly N to 150° F., the valves 456 and 464 are closed, and valves 462, 460 and 458 opened to allow heated water to recirculate through tubular coil 440 and second confined space defining shell 436. Water is admitted into the heater 438 when the valve 480 is open. The water heater 438 is heated by fuel from the fuel holder 466 which may conveniently be a tank in which diesel oil is stored and that has the diesel oil discharged by use of a pump 468 to the burner 469 to heat the tubular coil 440. The heated gases of combustion from the burner 469 flow through the scrubber 472 to have contaminants removed therefrom prior to the same being discharged to the ambient atmosphere through the flue 470. When the power generating assembly A is operating, it drives the electric generator 406, which has one terminal thereof connected by an electric conductor 510 to ground 492. A second conductor 512 extends from electric generator 406 to junction point 486a in conductor 486. Conductor 512 has a manually operated switch 514 therein. After the power generating device A starts to operate, the electric supply for the motors 416, 420 and 448 may be supplied from the generator 406. Power from the generator 406 is supplied to the above-identified motors by closing the switch 514 and opening the switch 488. Heat from the burner 486 need not be diesel oil, but may be waste products such as shredded wood, sawdust, and the like, or coal, which permits irrigation to take place without relying on electric power from a public utility company, which utility must, in turn, rely on foreign oil in the generation of electric power. The electric circuit used in supplying power to the motors in the assembly M is shown in dotted line in FIG. 9 to distinguish it from the piping also used in the system.

A second form A-2 of the engine is illustrated in FIG. 11 that includes a pressure vessel B' that has an upwardly convex end 110 that is located above a cylindrical side wall 114. A horizontal partition 600 extends transversely in the upper portion of side wall 114, with the partition and end 110 cooperating to define a confined space 602 in which an electrical generator 604 is disposed. The generator is actuated by a shaft 606 that extends downwardly therefrom through a sealed opening (not shown) in partition 600. The shaft 606 on the downwardly disposed end within the confined space 16 has a driven gear 608 secured thereto that is in toothed engagement with a driving gear 610 secured to crankshaft 32.

The pressure vessel B is illustrated in the drawings as being of one piece structure, but if desired may be defined by multiple flanged portions that are removably secured together by bolts or the like. The flanged portions may be separated for maintenance work.

Although the invention has been described as using a working medium that is a low boiling point liquid such as Freon 22, it will be apparent that water may be used to provide the high pressure vapor if a source of heat of suitable magnitude is used.

The use and operation of the various forms of the invention have been described previously in detail and need not be repeated.

What is claimed is:

1. An engine capable of receiving high pressure vapor from a heated source thereof and transforming a portion of the pressure energy thereof to rotational power prior to discharging said vapor at a lower pressure from said engine, said engine including:
   a. a confined space defining pressure vessel that includes a top and bottom, said confined space in communication with said high pressure source;
   b. a crankshaft that includes a plurality of throws and axially aligned straight end portions;
   c. first means for rotatably supporting said end portions in fixed positions in said confined space, said crankshaft extending between said top and bottom;
   d. a power generating assembly in said confined space for imparting rotary motion to said crankshaft, said assembly including a frame that occupies a fixed position relative to said pressure vessel; a plurality of parallel cylinders supported by said frame in axial alignment with said throws, each of said cylinders having a first closed end and a second open end adjacent said crankshaft, with each of said cylinders having a first high pressure vapor inlet port and second low pressure vapor discharge port therein adjacent said first end; a plurality of pistons slidably mounted in said cylinders, each of said pistons having first and second ends; and a plurality of piston rods pivotally connected to said second ends of said pistons and to said throws most adjacent thereto;
   e. conduit means for receiving low pressure vapor from said cylinders and directing said low pressure vapor to a location remote from the exterior of said pressure vessel;
   f. first rotatable valve means for sequentially establishing communication between each of said second ports and said conduit means;
   g. second rotatable valve means for sequentially establishing communication between each of said first ports and high pressure vapor in said confined space;
   h. second means actuated by the rotation of said crankshaft for so sequentially rotating said first and second valve means that as each of said pistons moves in a power stroke from said second end of said cylinder in which it is disposed towards said first end of said cylinder, due to the force exerted by said high pressure vapor on said first end of said piston, said first valve means maintains communication between said second port and said conduit means during the major portion of said power stroke, with said second valve means obstructing communication between said first port and high pressure vapor in said confined space during at least the major portion of said power stroke, said second valve means during at least the major portion of the return stroke of said piston maintaining communication between said high pressure vapor in said confined space and said first port for said piston to have said high pressure vapor exert equal and opposite forces on said first and second ends thereof and minimize the energy required to move said piston through said return stroke, and said first valve means obstructing communication between said second port and said conduit means during said return stroke;
   i. power take-off means operatively associated with said crankshaft for utilizing the rotational power of the latter due to the reciprocation of said pistons; and
   j. third means for lubricating said assembly and crankshaft as said pistons reciprocate and said crankshaft rotates.

2. An engine as defined in claim 1 in which said power take-off means includes:
   k. a tubular member that extends transversely through said bottom and is axially aligned with said end portions of said crankshaft; and
   l. a rotary seal in said tubular member, with the end portion of said crankshaft most adjacent said tubular member of sufficient length as to extend outwardly therethrough and engaging said rotary seal, and the part of said end portion of said crankshaft exteriorly of said tubular member being engageable for power generating purposes.

3. An engine as defined in claim 1 in which said top is upwardly convex and said engine in addition including:
   k. a transverse partition in said pressure vessel above said assembly that cooperates with said top to define a compartment,
   l. rotary electrical power generating means in said compartment;
   m. fourth means for transmitting rotary power from said crankshaft to said electrical power generating means; and
   n. a plurality of insulated electrical conductors that extend from said electrical power generating means through at least one seal defining opening in said pressure vessel to the exterior of said vessel.

4. An engine as defined in claim 1 in which said second means includes:
   k. a plurality of sprockets secured to said crankshaft and first and second rotatable valve means; and
   l. endless chain belt means that engage said plurality of sprockets and rotate said first and second rotatable valve means concurrently with the rotation of said crankshaft.

5. An engine as defined in claim 4 in which said first rotatable valve means includes:
   k. a block that extends around said cylinders adjacent said first ends thereof, said block having a first bore therein that extends along first sides of said cylinders adjacent said first ends thereof, said first bore in communication with said second ports;
   l. a seal defining opening in said top that is axially aligned with said first bore;
   m. a tubular member rotatably supported in said first bore that has an end portion extending upwardly through said seal defining opening to terminate thereabove in an outwardly disposed portion and said tubular member having a plurality of spaced openings therein that may be brought wholly or partially into registry with said second ports by rotating said outwardly disposed portion to control the effective area of said second ports in discharging low pressure vapor from said cylinders through said second ports;

n. a first tube rotatably and sealingly mounted in said tubular member, said first tube having a plurality of longitudinally spaced, circumferentially staggered third ports therein, said first tube having a first closed end adjacent said bottom, said first tube having one of said sprockets mounted thereon to so rotate said first tube that said third ports are sequentially brought into communication with said openings and second ports during at least the major portions of said power strokes; and o. third means operatively associated with said outwardly projecting portion of said first tube for rotating said first tube to control said effective areas, with said effective areas as they are decreased increasing the back pressure on low pressure vapor discharging from said cylinders, and the rate at which said crankshaft rotates decreasing as a result thereof.

6. An engine as defined in claim 5 in which said crankshaft is of sufficient weight as to have substantial kinetic energy when it rotates and said second ports being disposed inwardly in said cylinders from said first ends thereof, each of said pistons in the last portion of a power stroke moving past one of said second ports to block further low pressure vapor in said cylinder in which said piston is disposed escaping to said tubular member, with low pressure vapor in said cylinder between said first end thereof and said first end of said piston being compressed during the last portion of a power stroke due to the kinetic energy of said crankshaft and expanding on the first portion of the return stroke, and said second rotatable valve means not establishing communication between high pressure vapor in said confined space and the interior of said cylinder in which said piston is mounted until said piston has started said return stroke, with the compression and expansion of vapor in said cylinder serving to minimize the force exerted on said crankshaft as the direction of movement of each of said pistons is reversed.

7. An engine as defined in claim 4 in which said first rotatable valve means includes:

k. a block that extends around said cylinders adjacent said first ends thereof, said block having a first bore therein that extends along sides of said cylinders adjacent said first ends thereof, said first bore in communication with said second ports;

l. a tubular shell that extends through said bottom and is axially aligned with said first bore;

m. a tubular member rotatably supported at a fixed elevation in said first bore, with said tubular member having a plurality of spaced openings therein that may be brought wholly or partially into registry with said second ports by rotating said tubular member to control the effective area of said second ports in discharging low pressure vapor from said cylinder through said second ports;

n. a tube rotatably and sealingly mounted at a fixed elevation in said tubular member, said tube having a plurality of longitudinally spaced, circumferentially staggered third ports therein, said tube having a first closed end adjacent said top on which one of said sprockets is mounted to so rotate said tube that said third ports are sequentially brought into communication with said openings and second ports during at least the major portions of said power strokes; and o. third means that extend upwardly through said tubular shell to engage said tubular member and permit the latter to be rotatbly adjusted to control said effective areas, with said effective areas as they are decreased increasing the back pressure on low pressure vapor discharging from said cylinders, and the rate at which said crankshaft rotates decreasing as a result thereof.

8. An engine as defined in claim 7 in which said third means includes:

p. a transverse member extending across the interior of said tubular member;

q. a rod secured to said cross piece and extending downwardly therefrom below said tube; and r. a handle secured to said rod for manually rotating said tubular member.

9. An engine as defined in claim 5 in which said tube is defined by a plurality of interlocking sections that are stacked one above the other in said sleeve, with each of said sections having one of said third ports thereon.

10. An engine as defined in claim 5 in which said first ports in said cylinders are substantially oppositely disposed from said second ports, with said block having a second bore therein that is in communication with said first ports and parallel to said first bore, and said second rotatable valve means including:

1. a second tube rotatably supported in said second bore at a fixed elevation therein, said second tube having at least one open end in communication with high pressure vapor in said confined space, said second tube having a plurality of longitudinally spaced, circumferentially staggered fourth ports therein that sequentially move into registry with said first ports as said pistons move through said return strokes to permit said first and second ends of said pistons to be subjected to high pressure vapor that creates substantially equal and opposite forces thereon and that minimizes the work required to move said pistons through said return strokes, and said second tube having one of said sprockets secured thereto for rotating said second tube concurrently with the rotation of said crankshaft.

11. An engine as defined in claim 1 in which said frame includes an upper horizontal member, a lower horizontal member, and a plurality of intermediate horizontal members, and an upright that has them extending outwardly therefrom in the same direction, and said cylinders having at least said second ends thereof supported by said upright and extending therefrom in a direction opposite to the direction in which said upper, lower and intermediate members extend and a plurality of axially aligned bearings supported by said upper, lower and intermediate members, said bearings rotatably supporting axially aligned portions of said crankshaft.

12. An engine assembly as defined in claim 11 in which said pressure vessel includes a cylindrical vertically extending side wall, a top, and a downwardly concave bottom that serves as a reservoir for a liquid lubricant, and said third means includes:

k. a rotary pump disposed at a fixed position within said pressure vessel, said pump having a discharge outlet and an inlet in communication with said lubricant in said reservoir;

l. power transmission means for driving said rotary pump from the rotation of said crankshaft; and m. a conduit extending from said discharge to above said frame to lubricate said crankshaft and pistons by discharging said lubricant downwardly thereover as said engine operates.

13. A well water pumping assembly in combination with a well bore that has a rotary pump disposed downwardly therein that is driven by an upwardly extending shaft, an engine as defined in claim 1 in which said power take-off means is connected to said shaft, and said heated source of high pressure vapor includes:
- k. fourth means in communication with said conduit means for receiving said low pressure vapor and cooling the latter until it condenses to a liquid;
- l. fifth means for pressurizing said liquid;
- m. sixth means for allowing said pressurized liquid to expand to a vapor; and
- n. seventh means for heating said vapor to transform the same to high pressure vapor and discharging the same as high pressure vapor to said confined space in said engine to actuate said pistons and rotate said upwardly extending shaft, and rotary pump to pump water from said well bore.

14. An engine as defined in claim 13 in combination with a well bore that has a rotary pump disposed downwardly therein that is driven by an upwardly extending shaft that is rotated by power supplied from said power take-off, said low pressure vapor having the physical characteristic of condensing to a liquid when subjected to less than a predetermined temperature, with water discharged from said well bore by said rotary pump being at less than said predetermined temperature, and said fourth means including:
- o. a water discharge line in communication with said well bore;
- p. a hollow shell that has a water inlet and water outlet;
- q. ninth means for by-passing a portion of the water in said discharge line to the interior of said shell to flow therethrough to said outlet and return to said water discharge line; and
- r. a metallic coil in said shell that has first and second end portions thereof extending through sealed openings in said shell, said first end portion in communication with said conduit means and said second end portion in communication with said fifth means, with said vapor as it flows through said metallic coil being condensed to a liquid prior to passing through said second end portion.

15. The combination as defined in claim 14 in which said fifth means includes:
- s. a first pump having a liquid inlet and a liquid discharge, said liquid inlet in communication with said second end portion, and said liquid outlet in communication with said sixth means;
- t. a first electric motor that drives said first pump to cause the latter to deliver pressurized liquid to said sixth means;
- u. an electric generator driven by rotation of said crankshaft; and
- v. an electric circuit that connects said electric generator to said first motor.

16. The combination as defined in claim 15 in which said sixth means is an expansion valve and said fourth means includes:
- w. a second pump that has an inlet and an outlet;
- x. a second electric motor that drives said second pump, said second motor connected to said electric circuit; and
- y. conduit means that connect said inlet of said second pump to said water discharge line and said discharge of said second pump to saod water inlet into said shell.

17. The combination as defined in claim 13 in which said sixth means is an expansion valve through which said pressurized liquid discharges as a spray and said seventh means including:
- o. a metallic heat transmitting coil that has one end in communication with said expansion valve and the other end in communication with said confined space in said pressure vessel;
- p. a hollow shell that envelops the major portion of said coil, said shell having a liquid medium inlet and liquid medium discharge therefrom;
- q. a solar panel that includes solar heat absorbing passages therein in which a liquid medium is heated in flowing from a first end of said passages to a second end thereof;
- r. a pump having a liquid inlet and liquid discharge;
- p1 s. conduit means that connect said liquid medium discharge from said shell to said inlet of said pump, said discharge of said pump to said first end of said passages, and said second end of said passages to said liquid medium inlet in said shell; and
- t. an electric power supplied motor for driving said pump to circulate heated liquid medium from said solar panel through said conduit means to the interior of said shell to heat said vapor in said heat transmitting coil and transform the same to high pressure vapor and return cooled liquid heating medium through said conduit means to said passage to again be heated by solar heat and then recirculated to the interior of said shell.

18. The combination as defined in claim 17 which in addition includes:
- u. an electric generator driven by rotation of said crank shaft of said engine; and
- v. an electric circuit that connects said generator to said motor to drive the latter.

19. The combination as defined in claim 13 in which said sixth means is an expansion valve through which said pressurized liquid discharges as a spray, and said seventh means including:
- o. a metallic heat transmitting coil that has one end in communication with said expansion valve and the other end in communication with said confined space in said pressure vessel;
- p. a hollow shell that envelops the major portion of said coil, said shell having a liquid medium inlet and liquid medium discharge therefrom;
- q. a fuel fired boiler that has a heat absorbing passage therein in which a liquid medium is heated in flowing from a first end of said passage to a second end thereof;
- r. a pump having a liquid inlet and liquid discharge;
- s. conduit means that connect said liquid medium discharge from said shell to said inlet of said pump, said discharge of said pump to said first end of said passages, and said second end of said passages to said liquid medium inlet in said shell;
- t. an electric motor for driving said pump to circulate heated liquid medium from said passage in said pump through said conduit means to the interior of said shell to heat said vapor in said heat transmitting coil and transform the same to high pressure vapor and return cooled liquid heating medium through said conduit means to said passage in said boiler to again be heated and then recirculated to the interior of said shell.

20. The combination as defined in claim 19 which in addition includes:
- u. an electric generator driven by rotation of said crankshaft of said engine; and
- v. an electric circuit that connects said generator to said motor to drive the latter.

* * * * *